(12) United States Patent
Hwang et al.

(10) Patent No.: US 12,382,403 B2
(45) Date of Patent: Aug. 5, 2025

(54) MAXIMUM POWER REDUCTION

(71) Applicant: LG ELECTRONICS INC., Seoul (KR)

(72) Inventors: Jinyup Hwang, Seoul (KR); Suhwan Lim, Seoul (KR); Yoonoh Yang, Seoul (KR); Sangwook Lee, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 373 days.

(21) Appl. No.: 17/904,415

(22) PCT Filed: Feb. 19, 2021

(86) PCT No.: PCT/KR2021/002111
§ 371 (c)(1),
(2) Date: Aug. 17, 2022

(87) PCT Pub. No.: WO2021/167392
PCT Pub. Date: Aug. 26, 2021

(65) Prior Publication Data
US 2023/0071327 A1    Mar. 9, 2023

(30) Foreign Application Priority Data
Feb. 21, 2020   (KR) .......................... 10-2020-0021674

(51) Int. Cl.
*H04W 52/36* (2009.01)
*H04W 52/34* (2009.01)
(Continued)

(52) U.S. Cl.
CPC ......... *H04W 52/367* (2013.01); *H04W 52/34* (2013.01); *H04W 52/383* (2013.01); *H04W 72/20* (2023.01)

(58) Field of Classification Search
CPC ............ H04W 52/246; H04W 52/262; H04W 52/267; H04W 52/34; H04W 52/367;
(Continued)

(56) References Cited

U.S. PATENT DOCUMENTS

2013/0039289 A1    2/2013  Lee et al.
2015/0304962 A1*  10/2015  Fabien ................ H04W 52/247
                                                              370/329

(Continued)

OTHER PUBLICATIONS

PCT International Application No. PCT/KR2021/002111, International Search Report dated May 24, 2021, 4 page.

(Continued)

*Primary Examiner* — Nguyen T Vo
(74) *Attorney, Agent, or Firm* — LEE, HONG, DEGERMAN, KANG & WAIMEY

(57) ABSTRACT

One disclosure of the present specification provides a user equipment (UE). The UE comprises: a transceiver for transmitting a signal and receiving a signal; and a processor for controlling the transceiver, wherein the processor: obtains network signal (NS) 52; determines an additional maximum power reduction (A-MPR) configured on the basis of obtained NS 52; and determines a transmission power for a sidelink signal, on the basis of the determined A-MPR, the transceiver transmits, to another UE, the sidelink signal with the transmission power, the sidelink signal is transmitted within a band having a center frequency of 5885 MHz and a bandwidth of 40 MHz, and the A-MPR is configured on the basis of region 1, region 2, and region 3, and may be configured on the basis of QPSK, 16 QAM, 64 QAM, and 256 QAM modulation schemes.

13 Claims, 20 Drawing Sheets

(51) Int. Cl.
*H04W 52/38* (2009.01)
*H04W 72/20* (2023.01)

(58) Field of Classification Search
CPC ... H04W 52/383; H04W 72/20; H04W 88/06; H04W 92/18; Y02D 30/70
See application file for complete search history.

(56) References Cited

U.S. PATENT DOCUMENTS

| | | | |
|---|---|---|---|
| 2018/0103441 A1* | 4/2018 | Lim | H04B 7/0452 |
| 2019/0372741 A1 | 12/2019 | Kazmi et al. | |
| 2021/0105728 A1* | 4/2021 | Nguyen | H04W 52/367 |

OTHER PUBLICATIONS

LG Electronics, "A-MPR simulation assumptions and initial results for NR V2X UE at n47," R4-2001220, 3GPP TSG RAN WG4 meeting #94-e, Online, Mar. 2020, 12 pages.

Huawei et al., "TP on RF requirements for PC2 NR V2X UE in band n47," R4-2001084, 3GPP TSG-RAN WG4 Meeting #94-e, Electronic Meeting, Mar. 2020, 7 pages.

Huawei et al., "On NR-V2X UE RF requirements," R4-1915350, 3GPP TSG-RAN WG4 Meeting #93, Nov. 2019, 7 pages.

Huawei et al., "Discussion on MPR simulation assumption for NR V2X," R4-1908970, 3GPP TSG-RAN WG4 Meeting #92, Aug. 2019, 4 pages.

European Patent Office Application Serial No. 21756355.0, Search Report dated Mar. 6, 2024, 12 pages.

LG Electronics et al., "CR on introducing Tx requirements for 5G V2X UE in TS38. 101-1 in rel-16," R4-2001217, 3GPP TST-RAN4 Meeting #94-e, Online, Feb. 2020, 41 pages.

* cited by examiner

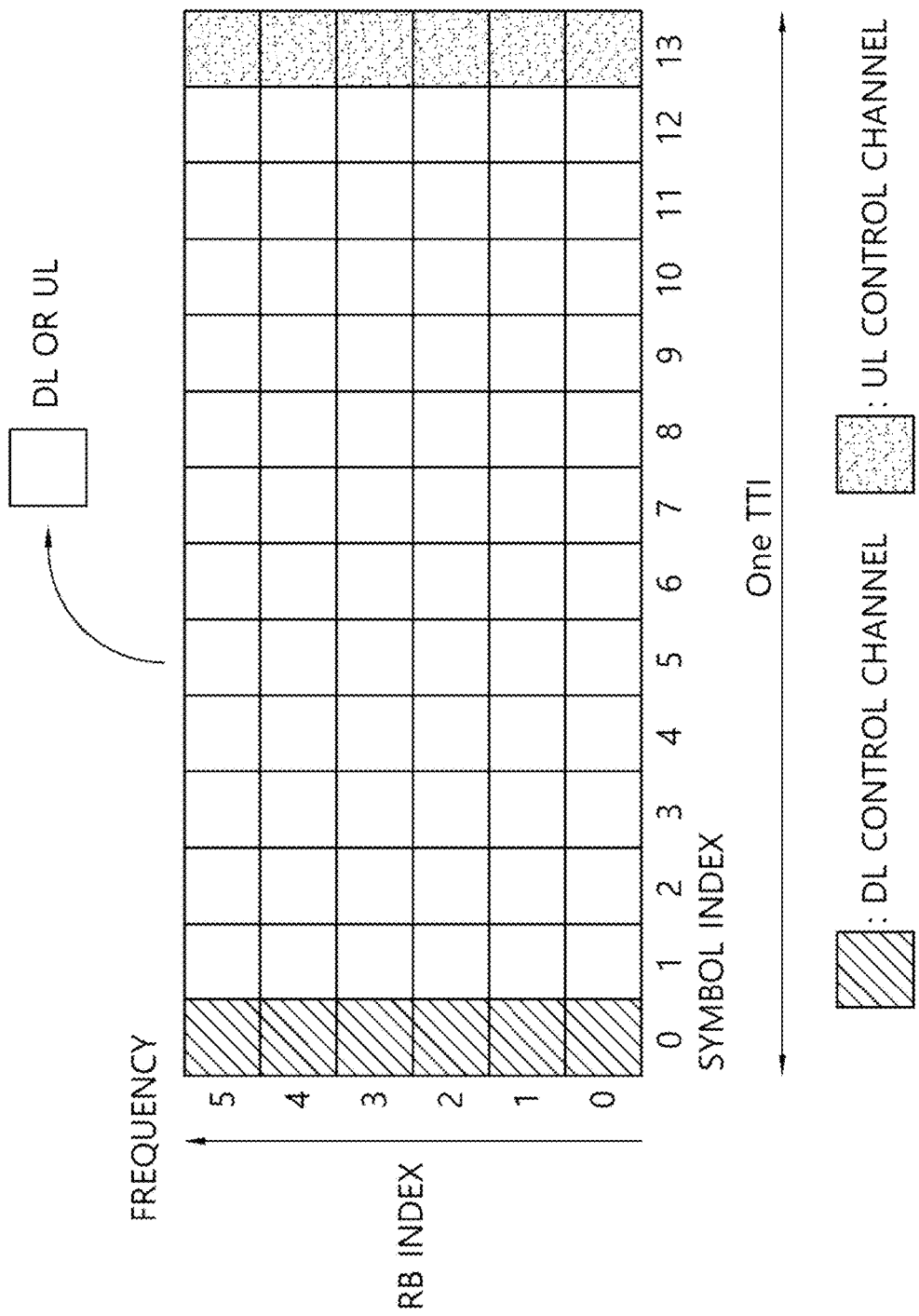

MAXIMUM POWER REDUCTION

CROSS-REFERENCE TO RELATED APPLICATION(S)

This application is the National Stage filing under 35 U.S.C. 371 of International Application No. PCT/KR2021/002111, filed on Feb. 19, 2021, which claims the benefit of earlier filing date and right of priority to Korean Application No. 10-2020-0021674, filed on Feb. 21, 2020, the contents of which are all hereby incorporated by reference herein in their entireties.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

The UE may determine the transmission power by applying the maximum output power requirements (or requirements) (maximum output power requirements). For example, the maximum output power requirement may be a Maximum Power Reduction (MPR) value and/or an Additional-MPR (A-MPR) value.

There is a problem in that there is no A-MPR for transmission of PSSCH and PSCCH between NR V2X UEs.

A-MPR for transmission of PSSCH and PSCCH between NR V2X terminals should be proposed.

SUMMARY

It enables efficient V2X communication by proposing A-MPR values between V2X terminals.

The present specification may have various effects.

For example, through the procedure disclosed in this specification, by applying A-MPR conforming to the FCC regulation conditions to the UE, the UE can perform V2X communication efficiently.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 8 shows an example of subframe types in NR.

DETAILED DESCRIPTION

Figure 1:
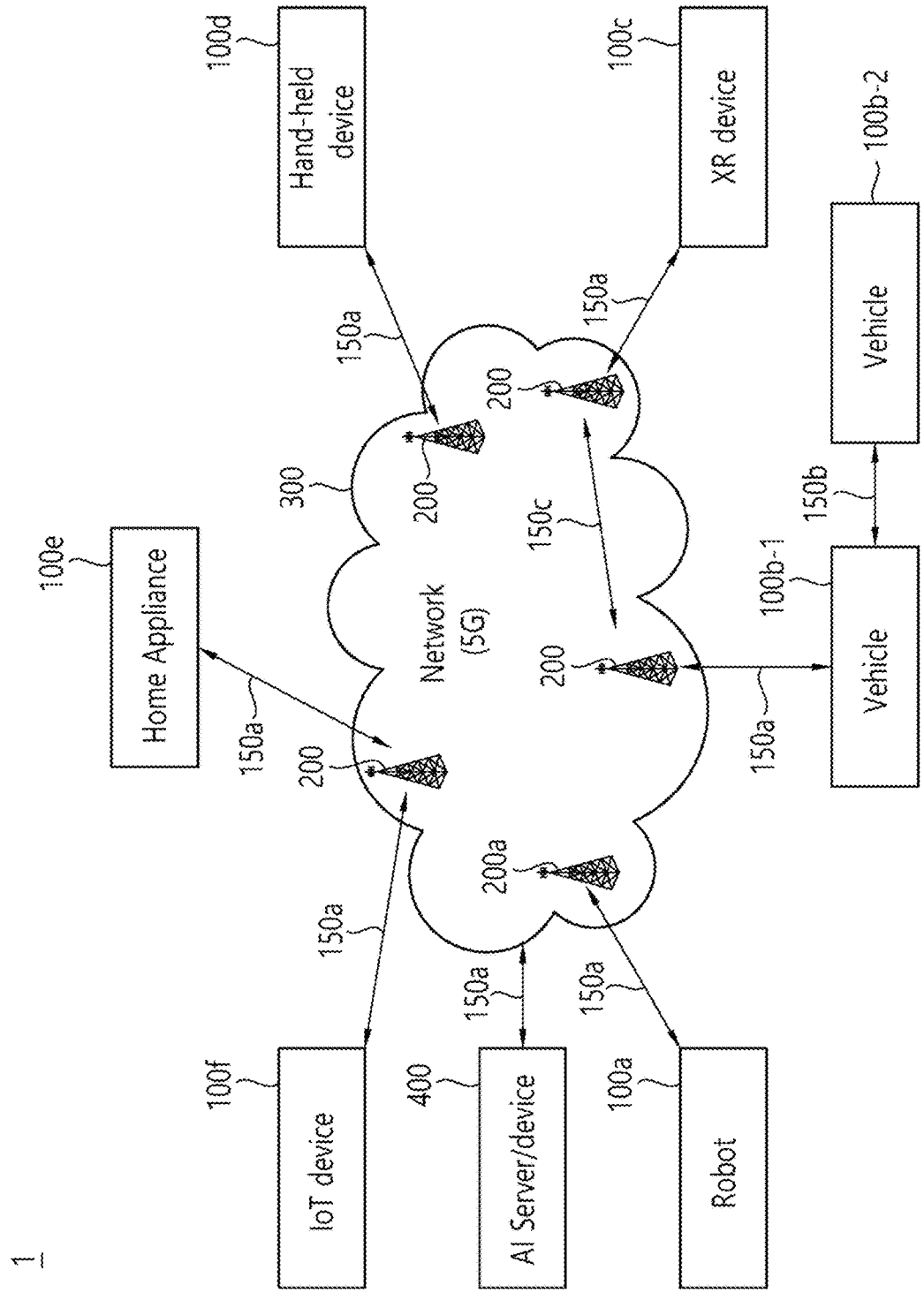
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration.

For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices $100a$ to $100f$ may be connected to the network 300 via the BSs 200. An AI technology may be applied to the wireless devices $100a$ to $100f$ and the wireless devices $100a$ to $100f$ may be connected to the AI server 400 via the network 300. The network 300 may be configured using a 3G network, a 4G (e.g., LTE) network, a 5G (e.g., NR) network, and a beyond-5G network. Although the wireless devices $100a$ to $100f$ may communicate with each other through the BSs 200/network 300, the wireless devices $100a$ to $100f$ may perform direct communication (e.g., sidelink communication) with each other without passing through the BSs 200/network 300. For example, the vehicles $100b$-1 and $100b$-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices $100a$ to $100f$.

Wireless communication/connections $150a$, $150b$ and $150c$ may be established between the wireless devices $100a$ to $100f$ and/or between wireless device $100a$ to $100f$ and BS 200 and/or between BSs 200. Herein, the wireless communication/connections may be established through various RATs (e.g., 5G NR) such as uplink/downlink communication $150a$, sidelink communication (or device-to-device (D2D) communication) $150b$, inter-base station communication $150c$ (e.g., relay, integrated access and backhaul (IAB)), etc. The wireless devices $100a$ to $100f$ and the BSs 200/the wireless devices $100a$ to $100f$ may transmit/receive radio signals to/from each other through the wireless communication/connections $150a$, $150b$ and $150c$. For example, the wireless communication/connections $150a$, $150b$ and $150c$ may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions. Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names.

Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
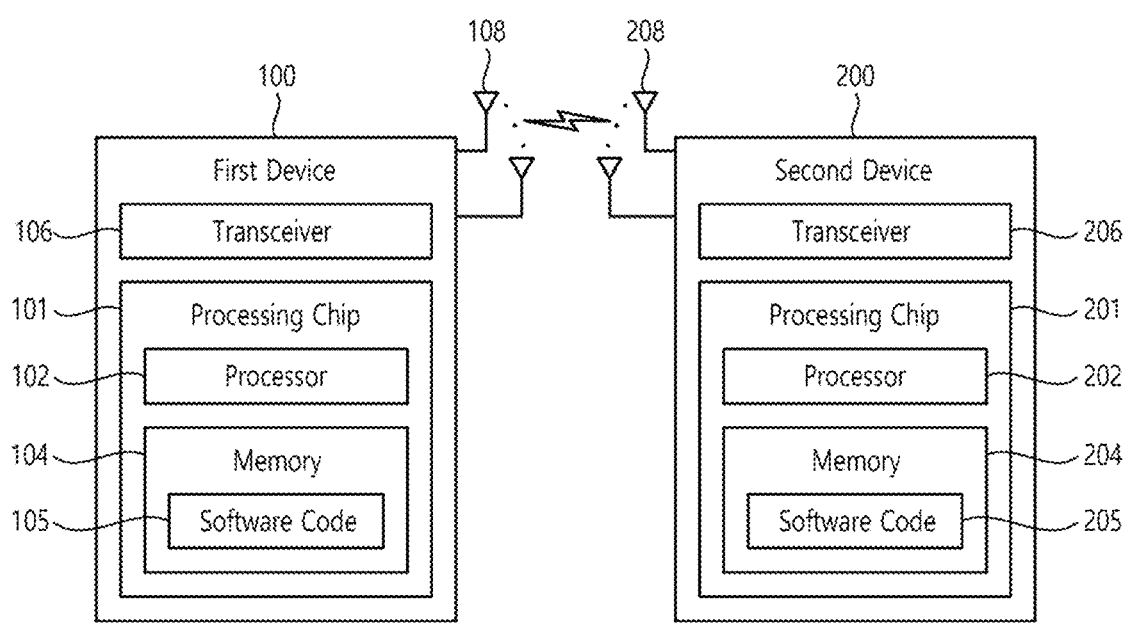
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
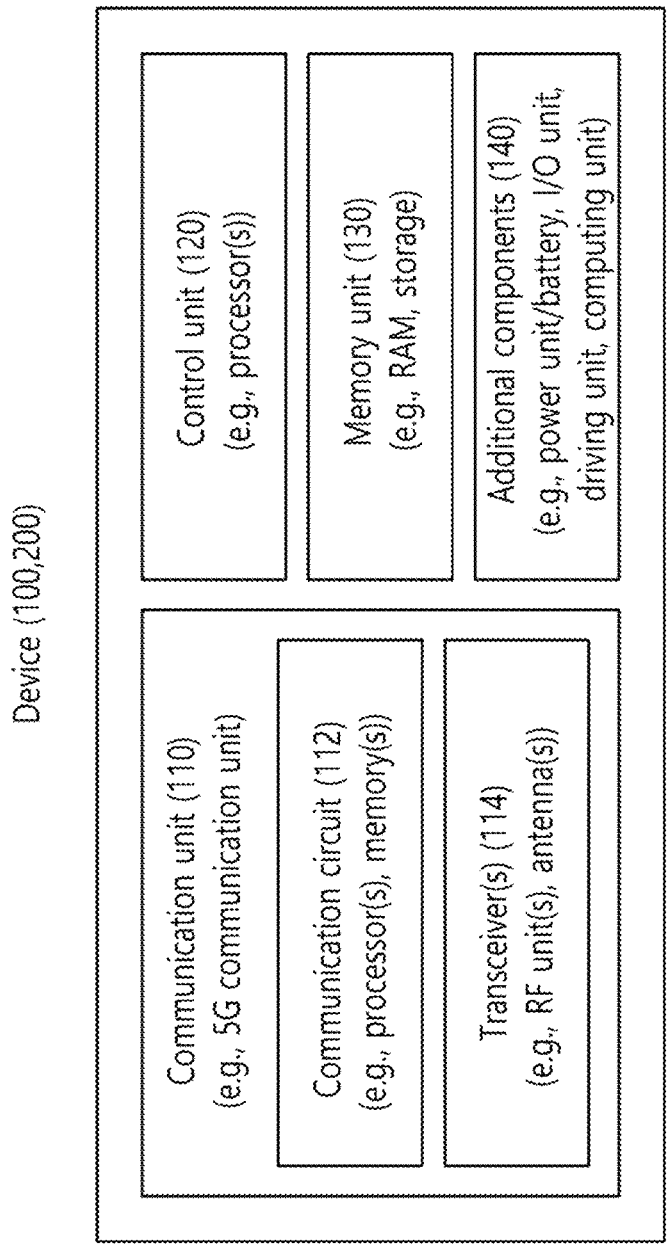
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
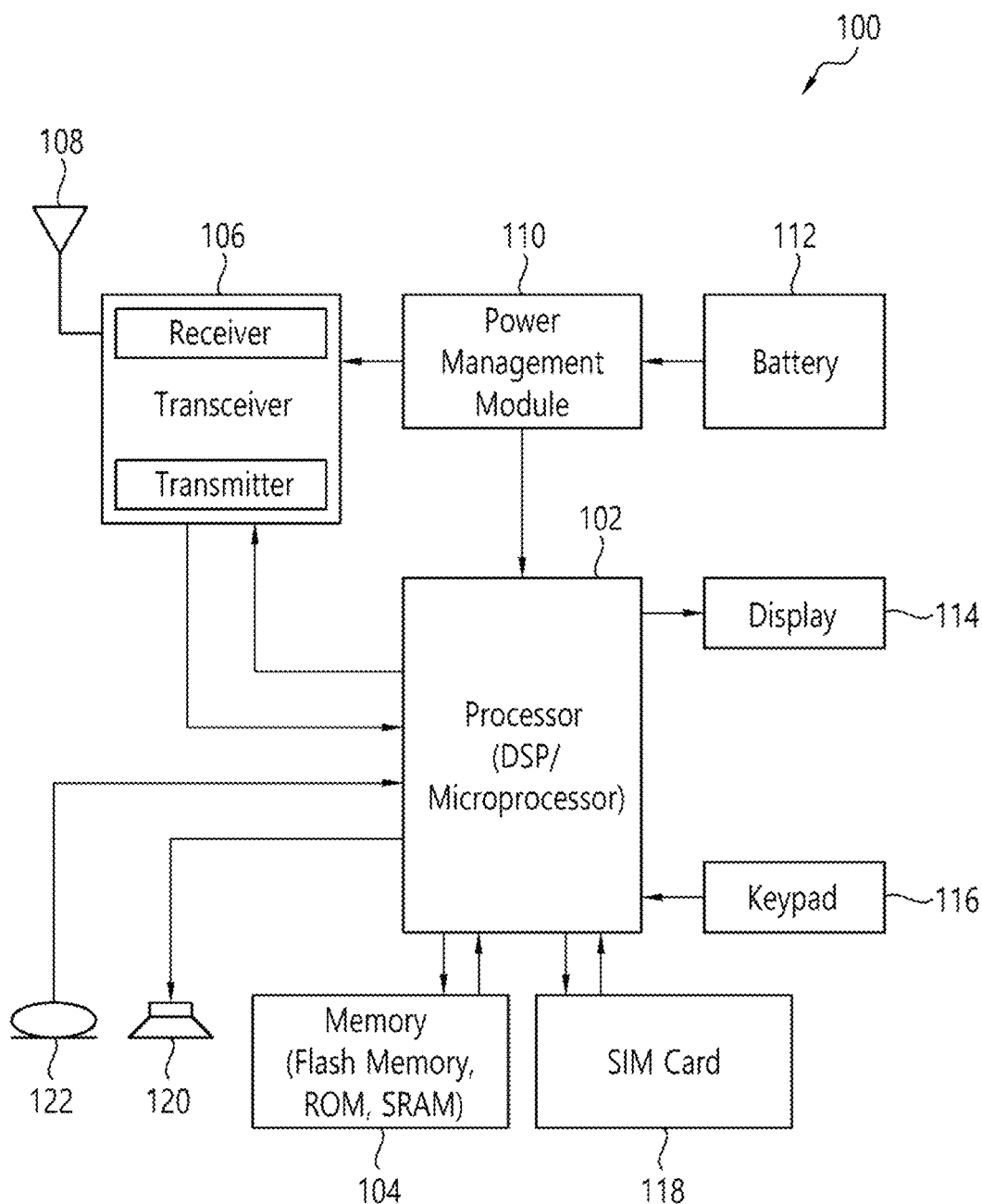
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

I. Techniques and Procedures Applicable to the Disclosure of this Specification

Figure 5:
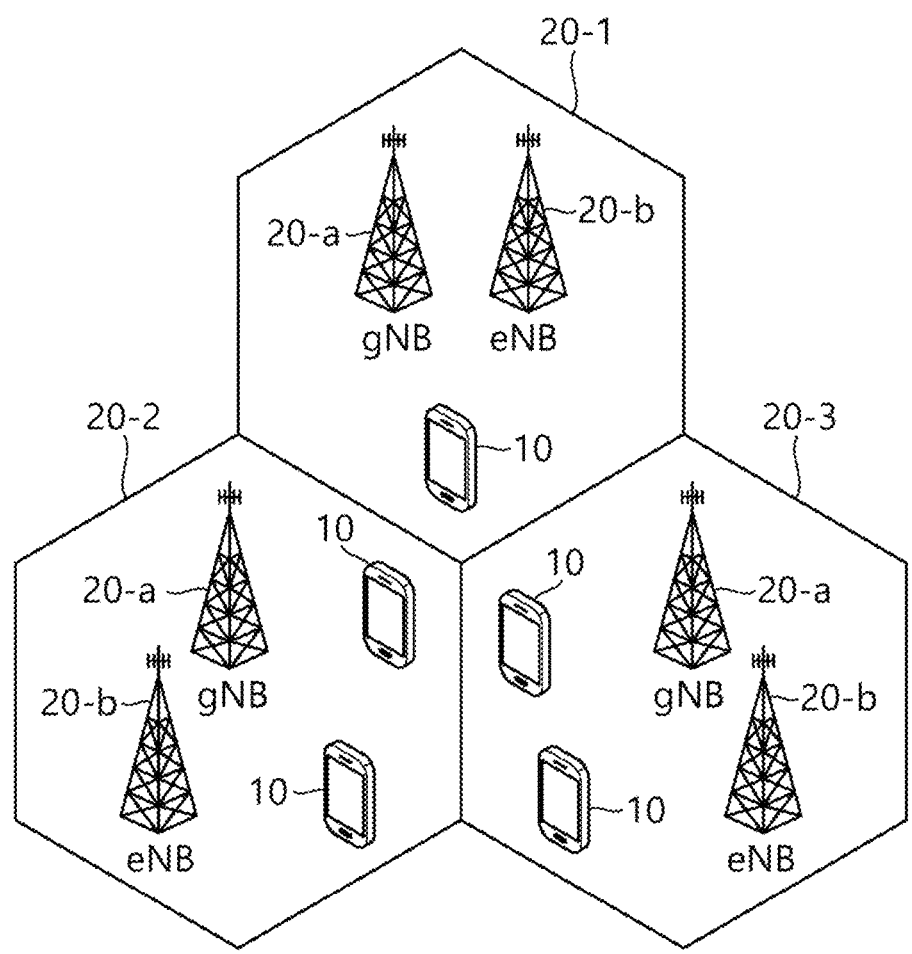
FIG. 5 is a wireless communication system.

FIG. 5 is a wireless communication system.

As can be seen with reference to FIG. 5, a wireless communication system includes at least one base station (BS). The BS is divided into a gNodeB (or gNB) 20a and an eNodeB (or eNB) 20b. The gNB 20a supports 5G mobile communication. The eNB 20b supports 4G mobile communication, that is, long term evolution (LTE).

Each base station 20a and 20b provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

<Operation Bands in NR>

The operating bands in NR are as follows.

The operating band of Table 3 below is an operating band converted from the operating band of LTE/LTE-A. This is called the FR1 band.

TABLE 3

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |

TABLE 3-continued

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

The table below shows the NR operating bands defined on the high frequency phase. This is called the FR2 band.

TABLE 4

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 6A:
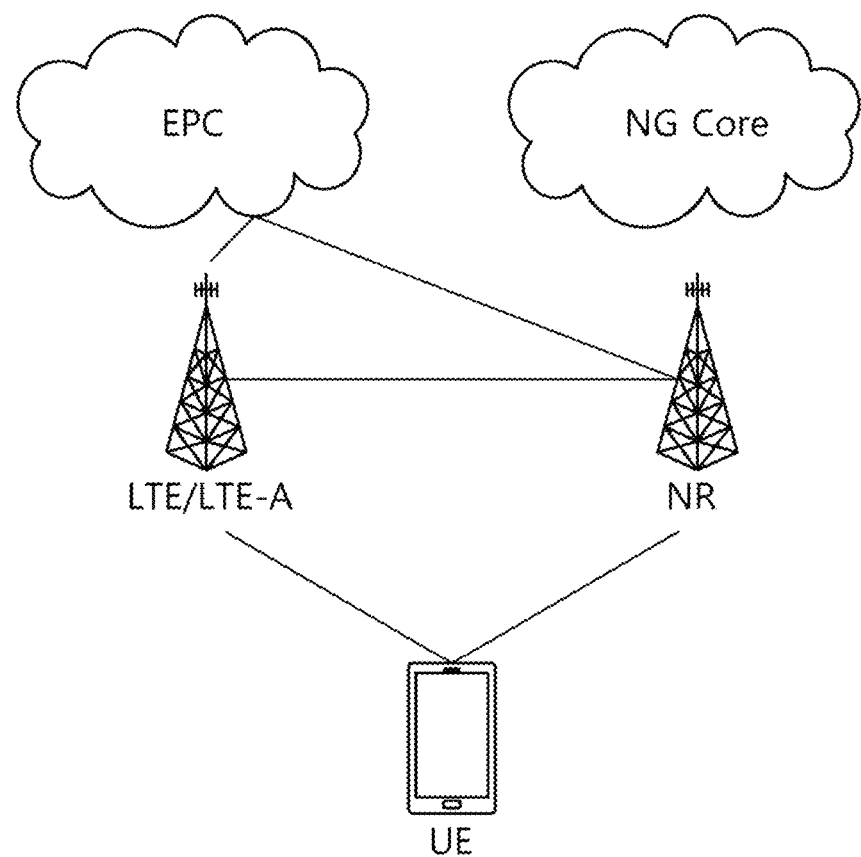
FIG. 6a to 6c are exemplary diagrams illustrating an exemplary architecture for a service of next-generation mobile communication.
Figure 6B:
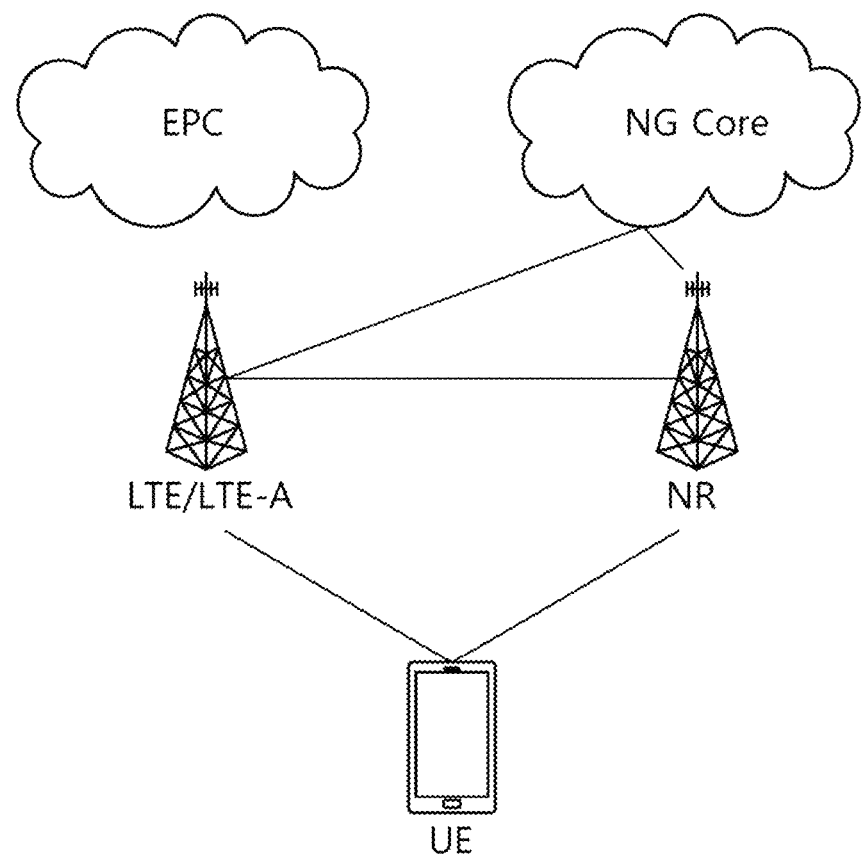
Figure 6C:
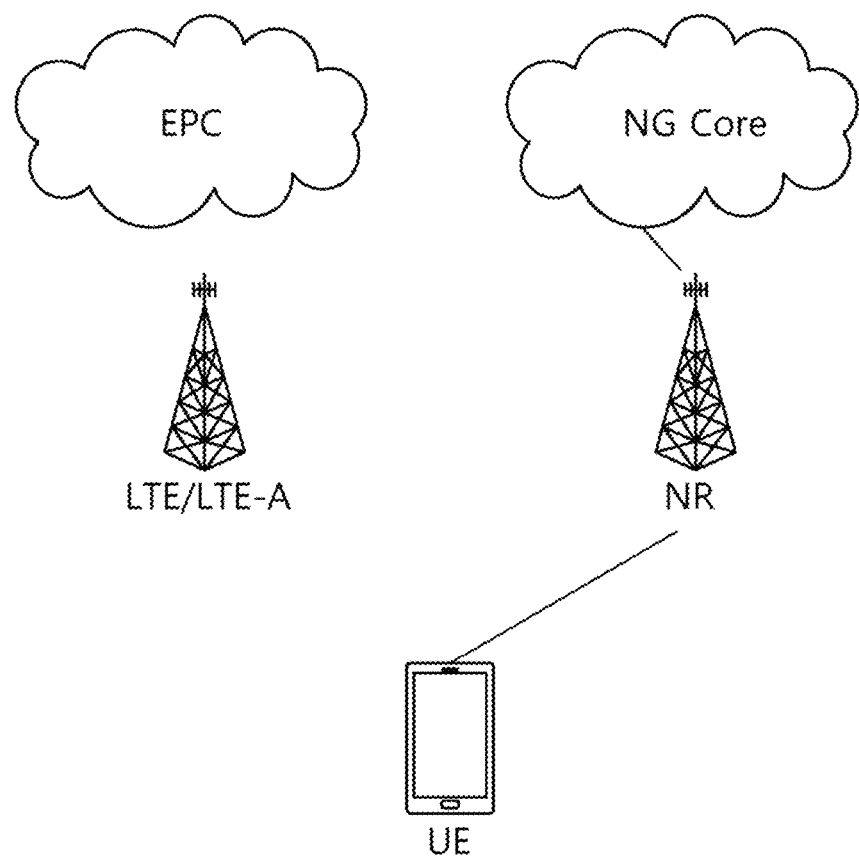

FIG. 6a to 6c are exemplary diagrams illustrating an exemplary architecture for a service of next-generation mobile communication.

Referring to FIG. 6a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 6b, unlike FIG. 6a, an LTE/LTE-A-based cell is connected to a core network for 5G mobile communication, that is, the LTE/LTE-A-based cell is connected to a Next Generation (NG) core network.

A service method based on the architecture shown in FIG. 6a and FIG. 6b is referred to as NSA (non-standalone).

Referring to FIG. 6c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 7:
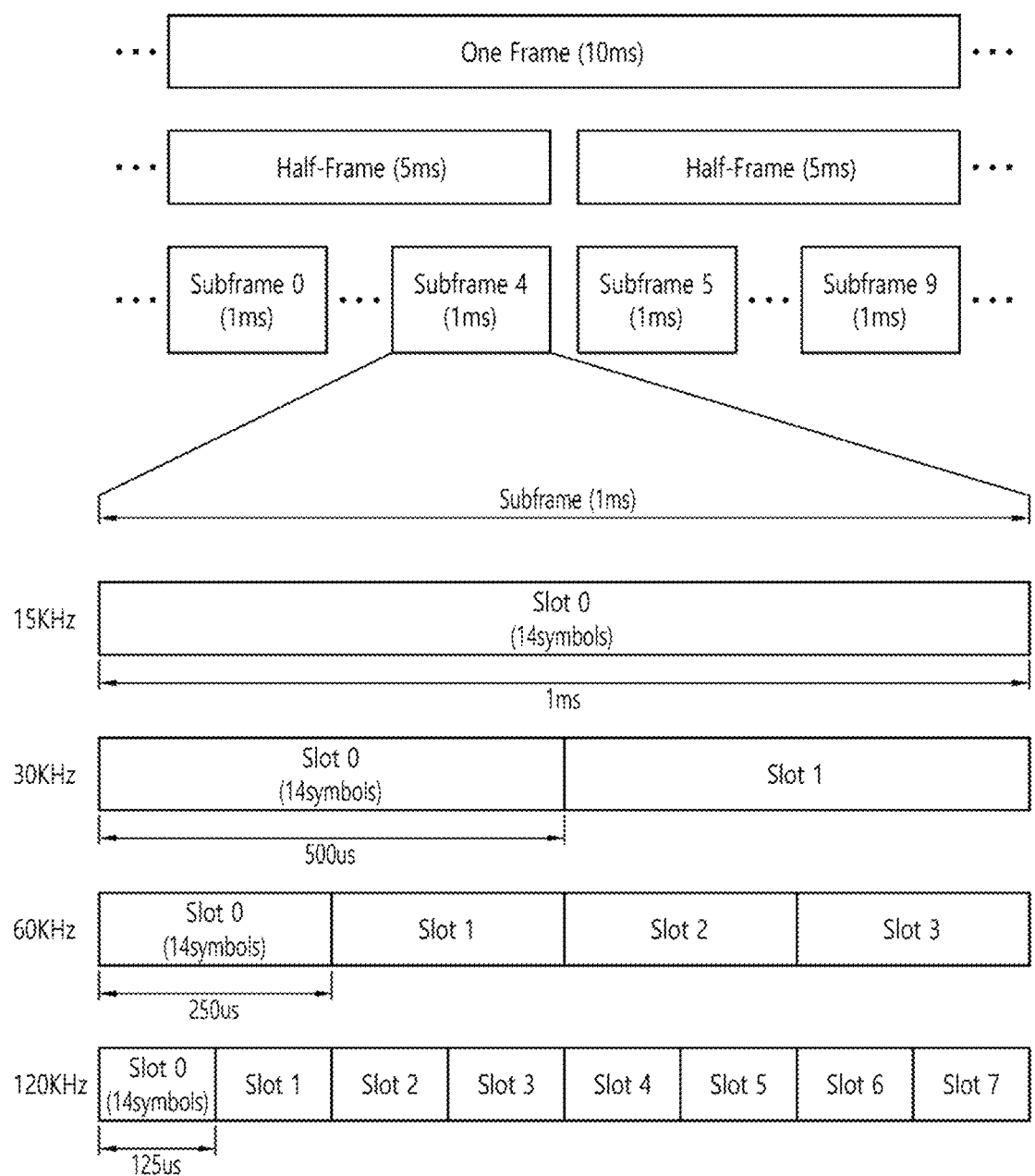
FIG. 7 illustrates structure of a radio frame used in NR.

FIG. 7 illustrates structure of a radio frame used in NR.

In NR, uplink and downlink transmission consists of frames. A radio frame has a length of 10 ms and is defined as two 5 ms half-frames (Half-Frame, HF). A half-frame is defined as 5 1 ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

FIG. 8 shows an example of subframe types in NR.

The TTI (transmission time interval) shown in FIG. 8 may be referred to as a subframe or a slot for NR (or new RAT). The subframe (or slot) of FIG. 8 may be used in a TDD system of NR (or new RAT) to minimize data transmission delay. As shown in FIG. 8, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 5

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OLDM symbols per slot $N_{symb}^{slot}$, the number of slots per frame $N_{slot}^{frame,\mu}$, and the number of slots per subframe $N_{slot}^{subframe,\mu}$ are expressed as shown in the following table.

TABLE 6

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OLDM symbols per slot $N_{symb}^{slot}$ number of slots per frame $N_{slot}^{frame,\mu}$, and the number of slots per subframe $N_{slot}^{subframe,\mu}$ are expressed as shown in the following table.

TABLE 7

| M | $N^{slot}_{symb}$ | $N^{frame,\mu}_{slot}$ | $N^{subframe,\mu}_{slot}$ |
|---|---|---|---|
| 2 | 12 | 40 | 4 |

<Maximum Power Reduction (MPR) and Allowed Additional MPR (A-MPR)>

Figure 9A:
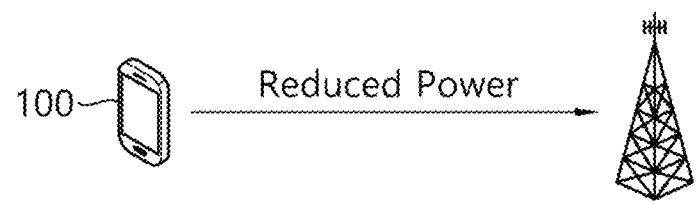
FIGS. 9a and 9b show an example of a method of limiting the transmission power of the UE.
Figure 9B:
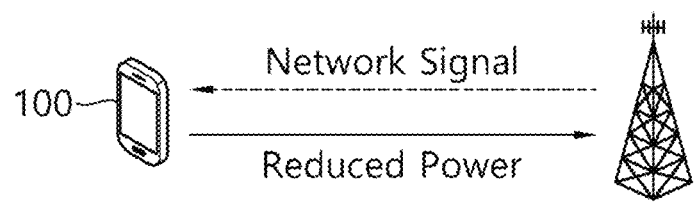

FIGS. 9a and 9b show an example of a method of limiting the transmission power of the UE.

Referring to FIG. 9a, the UE 100 may perform transmission with limited transmission power. For example, the UE 100 may perform uplink transmission to the base station through reduced transmission power.

When the peak-to-average power ratio (PAPR) value of the signal transmitted from the UE 100 increases, in order to limit the transmission power, the UE 100 applies a maximum output power reduction (MPR) value to the transmission power. By doing so, it is possible to reduce the linearity of the power amplifier PA inside the transceiver of the UE 100.

Referring to FIG. 9b, a base station (BS) may request the UE 100 to apply A-MPR by transmitting a network signal (NS) to the UE 100. In order not to affect adjacent bands, etc., an operation related to A-MPR may be performed. Unlike the MPR described above, the operation related to the A-MPR is an operation in which the base station additionally performs power reduction by transmitting the NS to the UE 100 operating in a specific operating band. That is, when the UE to which MPR is applied receives the NS, the UE may additionally apply A-MPR to determine transmission power.

<Operating Bands for V2X Communication>

Table 8 shows the operating band in E-UTRA V2X communication.

TABLE 8

| E-UTRA Operating Band | E-UTRA V2X Operating Band | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 47 | 47 | 5855 MHz-5925 MHz | 5855 MHz-5925 MHz | HD | PC5 |

E-UTRA V2X communication is designed to work concurrently with E-UTRA uplink/downlink in the operating band combinations listed in Table 9.

TABLE 9

| V2X concurrent band configuration | E-UTRA or V2X Operating Band | Interface | Uplink (UL) operating band BS receive UE transmit $F_{UL\_low} - F_{UL\_high}$ | Downlink (DL) operating band BS transmit UE receive $F_{DL\_low} - F_{DL\_high}$ | Duplex Mode |
|---|---|---|---|---|---|
| V2X_3-47 | 3 | Uu | 1710 MHz-1785 MHz | 1805 MHz-1880 MHz | FDD |
| | 47 | PC5 | 5855 MHz-5925 MHz | 5855 MHz 5925 MHz | HD |
| V2X_5-47 | 5 | Uu | 824 MHz-849 MHz | 869 MHz-894 MHz | FDD |
| | 47 | PC5 | 5855 MHz-5925 MHz | 5855 MHz-5925 MHz | HD |
| V2X_7-47 | 7 | Uu | 2500 MHz-2570 MHz | 2620 MHz-2690 MHz | FDD |
| | 47 | PC5 | 5855 MHz-5925 MHz | 5855 MHz 5925 MHz | HD |
| V2X_8-47 | 8 | Uu | 880 MHz-915 MHz | 925 MHz-960 MHz | FDD |
| | 47 | PC5 | 5855 MHz-5925 MHz | 5855 MHz 5925 MHz | HD |
| V2X_20-47 | 20 | Uu | 832 MHz-862 MHz | 791 MHz-821 MHz | FDD |
| | 47 | PC5 | 5855 MHz-5925 MHz | 5855 MHz 5925 MHz | HD |
| V2X_28-47 | 28 | Uu | 703 MHz-748 MHz | 758 MHz-803 MHz | FDD |
| | 47 | PC5 | 5855 MHz-5925 MHz | 5855 MHz 5925 MHz | HD |
| V2X_34-47 | 34 | Uu | 2010 MHz-2025 MHz | 2010 MHz-2025 MHz | TDD |
| | 47 | PC5 | 5855 MHz 5925 MHz | 5855 MHz 5925 MHz | HD |
| V2X_39-47 | 39 | Uu | 1880 MHz-1920 MHz | 1880 MHz-1920 MHz | TDD |
| | 47 | PC5 | 5855 MHz-5925 MHz | 5855 MHz-5925 MHz | HD |
| V2X_41-47 | 41 | Uu | 2496 MHz-2690 MHz | 2496 MHz 2690 MHz | TDD |
| | 47 | PC5 | 5855 MHz-5925 MHz | 5855 MHz-5925 MHz | HD |
| V2X_71-47 | 71 | Uu | 663 MHz-698 MHz | 617 MHz-652 MHz | FDD |
| | 47 | PC5 | 5855 MHz-5925 MHz | 5855 MHz 5925 MHz | HD |

E-UTRA V2X communication is also designed to operate for in-band multi-carrier operation in the operating bands defined in Table 10.

TABLE 10

| V2X multi-carrier Band configuration | V2X operating Band | Interface |
|---|---|---|
| V2X_47 | 47 | PC5 |

Figure 10:
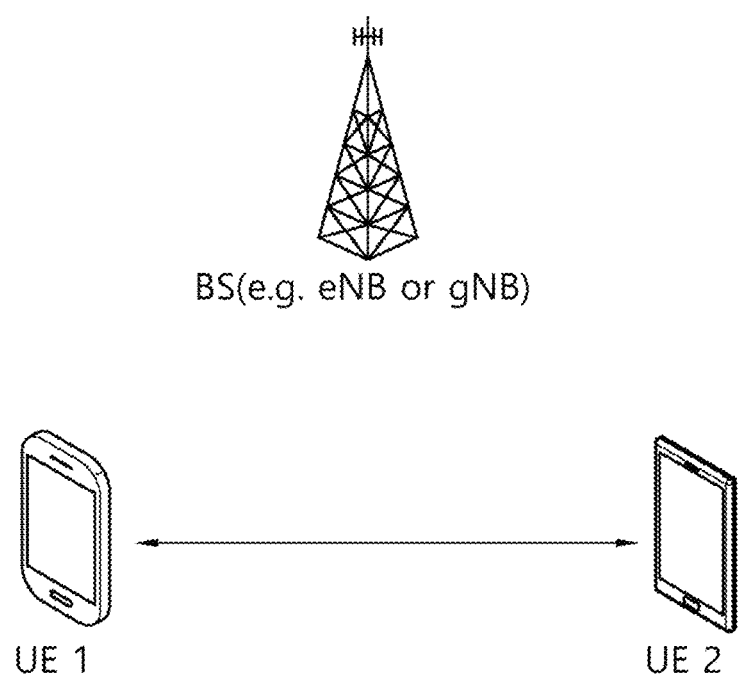
FIG. 10 shows the UE performing V2X or sidelink communication according to an embodiment of the present disclosure.

FIG. 10 shows the UE performing V2X or sidelink communication according to an embodiment of the present disclosure.

The embodiment of FIG. 10 may be combined with various embodiments of the present disclosure.

Referring to FIG. 10, the term UE in V2X or sidelink communication may mainly refer to a user's terminal. However, when network equipment such as a base station transmits and receives signals according to a communication method between UEs, the base station may also be regarded as a kind of terminal. For example, UE 1 may be the first apparatus 100, and UE 2 may be the second apparatus 200.

For example, UE 1 may select a resource unit corresponding to a specific resource from a resource pool indicating a set of a series of resources. And, UE 1 may transmit a sidelink signal using the resource unit. For example, UE 2, which is a receiving UE, may be configured with a resource pool through which UE 1 can transmit a signal, and may detect a signal of UE 1 in the resource pool.

Here, when the UE 1 is within the connection range of the base station, the base station may inform the UE 1 of the resource pool. On the other hand, when the UE 1 is outside the connection range of the base station, another UE informs the UE 1 of the resource pool, or the UE 1 may use a preset resource pool.

In general, the resource pool may be composed of a plurality of resource units, and each UE may select one or a plurality of resource units to use for its own sidelink signal transmission.

Hereinafter, resource allocation in the sidelink will be described.

Figure 11:
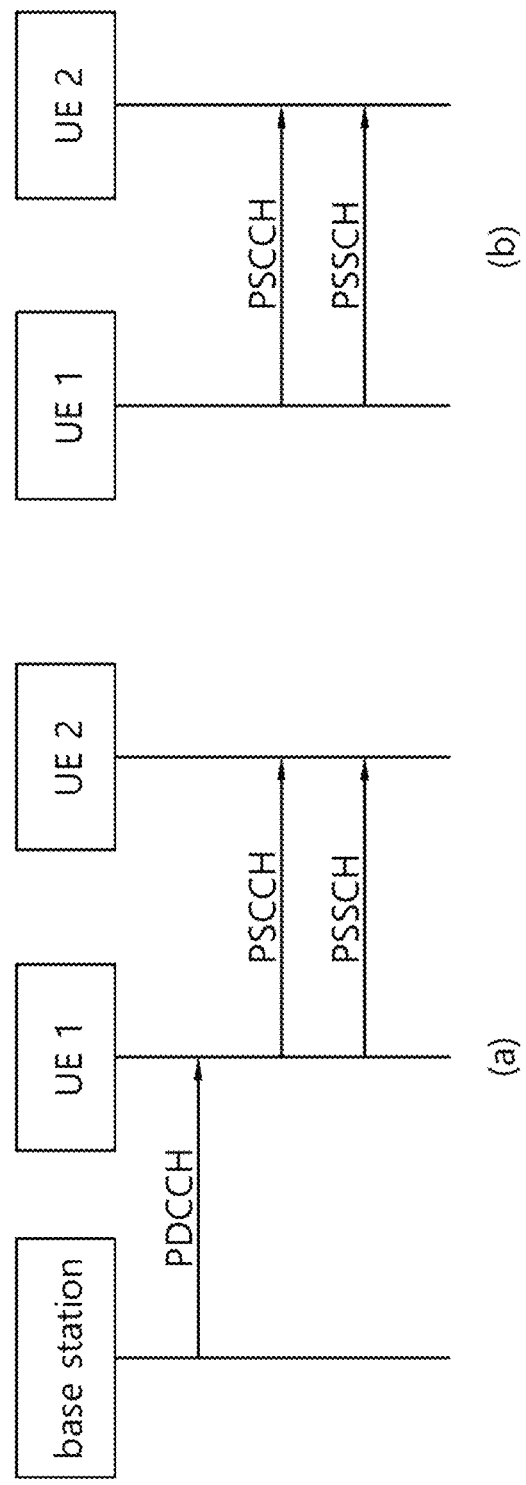
FIG. 11 illustrates a procedure for an UE to perform V2X or sidelink communication according to a transmission mode, according to an embodiment of the present disclosure.

FIG. 11 illustrates a procedure for an UE to perform V2X or sidelink communication according to a transmission mode, according to an embodiment of the present disclosure.

The embodiment of FIG. 11 may be combined with various embodiments of the present disclosure. In various embodiments of the present disclosure, the transmission mode may be referred to as a mode or a resource allocation mode. Hereinafter, for convenience of description, a transmission mode in LTE may be referred to as an LTE transmission mode, and a transmission mode in NR may be referred to as an NR resource allocation mode.

For example, (a) of FIG. 11 shows an UE operation related to LTE transmission mode 1 or LTE transmission mode 3. Or, for example, (a) of FIG. 11 shows an UE operation related to NR resource allocation mode 1. For example, LTE transmission mode 1 may be applied to general sidelink communication, and LTE transmission mode 3 may be applied to V2X communication.

For example, (b) of FIG. 11 shows an UE operation related to LTE transmission mode 2 or LTE transmission mode 4. Or, for example, (b) of FIG. 11 shows an UE operation related to NR resource allocation mode 2.

Referring to (a) of FIG. 11, in LTE transmission mode 1, LTE transmission mode 3, or NR resource allocation mode 1, the base station may schedule a resource to be used by the UE for sidelink transmission. For example, the base station may perform resource scheduling to UE 1 through PDCCH (more specifically, Downlink Control Information (DCI)), and UE 1 may perform V2X or sidelink communication with UE 2 according to the resource scheduling. For example, UE 1 transmits SCI (Sidelink Control Information) to UE 2 through a Physical Sidelink Control Channel (PSCCH), and then transmits data based on the SCI to UE 2 through a Physical Sidelink Shared Channel (PSSCH).

Referring to (b) of FIG. 11, in LTE transmission mode 2, LTE transmission mode 4 or NR resource allocation mode 2, the UE may determine a sidelink transmission resource within a sidelink resource set by a base station/network or a preset sidelink resource. For example, the configured sidelink resource or the preset sidelink resource may be a resource pool. For example, the UE may autonomously select or schedule a resource for sidelink transmission. For example, the terminal may perform sidelink communication by selecting a resource by itself within a set resource pool. For example, the terminal may select a resource by itself within the selection window by performing a sensing (sensing) and resource (re)selection procedure. For example, the sensing may be performed in units of subchannels. In addition, UE 1, which has selected a resource within the resource pool, transmits the SCI to UE 2 through the PSCCH, and may transmit data based on the SCI to UE 2 through the PSSCH.

II. Disclosure of the Present Specification

This specification proposes a new additional maximum output power reduction (A-MPR) applied to the NR V2X UE.

NR V2X supports subcarrier spacing of 15 kHz, 30 kHz, and 60 kHz, so each A-MPR performance analysis is required. Based on the measured results, we propose A-MPR performance requirements for NR V2X UE.

As defined in FCC regulation, A-SEM (additional spectrum emission mask) and A-MPR by NS_52 signal are applied. NS_52 may use the n47 band. And the n47 band has a frequency of 5855 MHz-5925 MHz. In addition, a channel bandwidth of 40 MHz may be used.

Conventionally, there was no proposal for A-MPR to be applied to PSSCH/PSCCH transmission by the NR V2X UE for NS_33 according to EU regulation. This specification proposes a new A-MPR applied to the NR V2X sidelink UE.

For reference, as an example of a wireless communication device capable of performing wireless communication hereinafter, terms such as "terminal" and "UE" may be used. For reference, the A-MPR value described in the disclosure of this specification may be an example of a maximum output power requirement. The same value as the A-MPR value described in the disclosure of this specification may also be used as the MPR value.

1. First Disclosure of the Present Specification 1-1. Assumptions for Measuring A-MPR Hereinafter, assumptions for measuring A-MPR will be described. The assumptions described below were used to measure and determine the maximum output power requirement (e.g., A-MPR/MPR performance requirement) for UE operating in the n47 band of NR in the disclosure of this specification.

Figure 12:
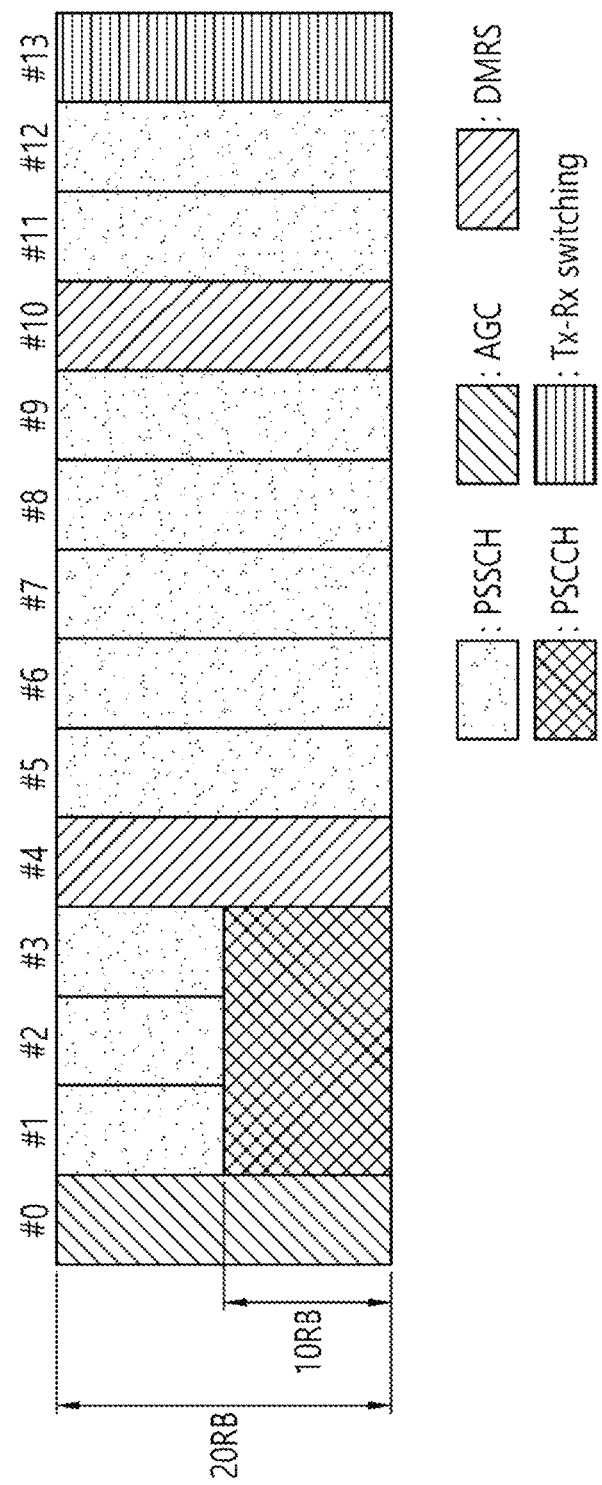
FIG. 12 shows one of assumptions for measuring A-MPR.

The basic A-MPR simulation assumptions are:
The center frequency was assumed to be 2.7 GHz/5.9 GHz.
Frequency band assumed 10/20/30/40 MHz.
The maximum transmit power is assumed to be 23 dBm.
Numerology, that is, subcarrier spacing type, assumed 15 kHz/30 kHz/60 kHz.
QPSK/16QAM/64QAM/256QAM with modulation orders of 4, 16, 64, and 256 were assumed.
Waveform assumed CP-OFDM.
Carrier leakage is assumed to be 25dBc.
IQ image assumed 25dBc.
CIM3 assumed 45/60dBc.
PA calibrated to provide −30dBc ACLR for fully allocated RB in 20 MHz QPSK DFT-S-OFDM waveform at 1 dB MPR. This is based on the assumption that the PA is shared between LTE V2X and NR V2X at 5.9 GHz in the worst case.
Additional A-MPR simulation assumptions are as follows.
The allowed sub-channel size assumes (10, 15, 20, 25, 50, 75, 100) PRBs.
Allowed $L_{CRB}$ quota is 10, 15, 20, 25, 30, 40, 45, 50, 60, 70, 75, 80, 90, 100, 105, 110, 120, 130, 135, 140, 150, 160, 165, 170, 175, 180, 190, 195, 200, 210 were assumed.
The size of −PSCCH is assumed to be 10RB*3symbol. FIG. 12 shows.
The PSD offset of X dB between the PSCCH and the PSSCH was assumed to be 0 dB.
FIG. 12 shows one of assumptions for measuring A-MPR.
FIG. 12 shows PSCCH/PSSCH multiplexing.

TABLE 11

| $\Delta f_{OOB}$ (MHz) | Emission Limit (dBm) | Measurement Bandwidth |
|---|---|---|
| ±0-2 | −32 | 100 kHz |
| ±2-10 | −36 | 100 kHz |
| ±10-20 | −38 | 100 kHz |
| ±20-40 | −43 | 100 kHz |
| ±40-100 | −50 | 100 kHz |

To comply with FCC regulation conditions, RAN4 defines A-MPR according to NS_xx. NS_xx may be by a pre-configured radio parameter, or by a cell, or by an instruction performed by a higher layer to the NR V2X UE. Based on the simulation results, we propose an acceptable A-MPR for maximum output power due to higher-order modulation and transmission bandwidth configuration (resource blocks).

Table 12 shows A-MPR for NR V2X.

TABLE 12

| Network Signalling value | Requirements | NR Band | Channel bandwidth (MHz) | Resources Blocks ($N_{RB}$) | A-MPR (dB) |
|---|---|---|---|---|---|
| NS_xx | table 11 | n47 | 40 | | table 14 |

Table 13 shows examples of $N_{RB}$ according to bands and SCS.

TABLE 13

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 70 MHz NRB | 80 MHz NRB | 90 MHz NRB | 100 MHz NRB |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

The horizontal axis represents the index of the symbol of the sidelink sequentially from the left as an index, and the vertical axis represents the number of RBs.

When 10RB*3symbols are allocated to the PSCCH, a portion may be allocated to the index 1-3 symbol position, and the PSSCH may be allocated to the remaining portion of the index 1-3 symbol for multiplexing.

Even if the total allocated RBs increases, the PSCCH may be allocated up to 10 RBs and the remaining portion may be allocated with the PSSCH to be multiplexed.

DMRS may use symbols of indexes 4 and 10. Transmission and reception can be switched using the 13th index symbol.

1-2. A-MPR based on A-SEM

The A-MPR condition may be derived with Additional SEM (A-SEM) to protect the adjacent The Industrial, Scientific, and Medical (ISM) frequency range.

The 40 MHz FCC regulation conditions in the Intelligent Transportation Systems (ITS) spectrum are shown in Table 11.

Table 11 shows A-SEM conditions in a carrier frequency of 5885 MHz and a channel bandwidth of 40 MHz.

For example, with a bandwidth of 40 MHz and an SCS of 15 kHz, the $N_{RB}$ is 216.

QPSK is a modulation method with a modulation order of 4, 16QAM is a modulation method with a modulation order of 16, 64QAM is a modulation method with a modulation order of 64, and 256QAM refers to a modulation method with a modulation order of 256.

The UE may be allocated a 40 MHz channel bandwidth and use it for signal transmission. The channel band consists of two guard bands at the edges and as many RBs as the number of $N_{RB}$ in the middle. That is, the $N_{RB}$ refers to the number of RBs allocated for signal transmission. Therefore, $N_{RB}$ is the maximum number of RBs considering the channel bandwidth and SCS. The signal may be transmitted using some RBs among the allocated $N_{RB}$ RBs. The first RB among some RBs used is called startRB.

$N_{RB}$ corresponds to an integer. Each of the plurality of allocated RBs may be numbered in the order of frequency, up to the $N_{RB}$.

Table 14 shows A-MPR applicable to a channel bandwidth of 40 MHz and a carrier frequency (fc) of 5885 MHz.

TABLE 14

| Modulation | A-MPR(dB) | | |
|---|---|---|---|
| | Edge RB allocations | Outer RB allocations | Inner RB allocation |
| QPSK | ≤(9.5 + Δ(Note1)) | ≤8.0 | ≤3.5 |
| 16 QAM | | ≤8.0 | ≤3.5 |
| 64 QAM | | ≤8.5 | ≤4.5 |
| 256 QAM | | ≤8.5 | ≤6.0 |

Note1:
Δ is 0, 3, and 5 when SCS is 60 kHz, 30 kHz, and 15 kHz, respectively.

The plurality of RBs may be divided into three zones, and the A-MPR value may be determined. $N_{RB}$ RBs may be divided into 3 zones (Edge RB allocations, Outer RB allocations, Inner RB allocations). $RB_{Start,Low}$ corresponds to max(1, floor($N_{RB}$/k1)). Here, the max(x, y) function is a function that outputs the higher of x and y. Therefore, $RB_{Start,Low}$ is the higher of 1 and floor($N_{RB}$/k1). If $N_{RB}$ is greater than 10 and k1 is 3.5, $RB_{Start,Low}$ may be floor($N_{RB}$/k1). Here, the floor(x) function is a function that outputs the largest integer among integers less than or equal to x. For example, if x is 2.4, floor(x) is 2, and if x is 3, floor(x) is 3.

$RB_{Start,High}$ correspond to $N_{RB}$-$RB_{Start,Low}$-$L_{CRB}$. Here, $L_{CRB}$ must be less than or equal to ceil($N_{RB}$/k1). Here, the ceil(x) function is a function that outputs the smallest integer among integers greater than or equal to x. For example, if x is 2.4, ceil(x) is 3, and if x is 3, ceil(x) is 3. k1 may be 3.5. However, other values of k1 are possible (e.g., 0.1, 0.2, . . . , 1, 1.1, . . . ).

Inner RB allocation refers to an RB whose RB number is greater than or equal to $RB_{Start, Low}$ and less than or equal to $RB_{Start, High}$. It may be called Region 3.

Edge RB allocation refers to RBs allocated to an interval as much as floor($N_{RB}$*0.2) at both the beginning and the end. That is, RBs with an RB number equal to or less than floor($N_{RB}$*0.2) and RBs with an RB number greater than or equal to $N_{RB}$-floor($N_{RB}$*0.2) are referred to as edge RB allocation. It may be called Region 1.

Outer RB allocation refers to an RB that is neither inner RB allocation nor edge RB allocation among $N_{RB}$ RBs. It can be called Region 2.

In the 40 MHz band and 15 kHz subcarrier spacing (SCS), the $L_{CRB}$ may be 10, 15, 20, 25, 30, 40, 45, 50, 60, 70, 75, 80, 90, 100, 105, 110, 120, 130, 135. , 140, 150, 160, 165, 170, 175, 180, 190, 195, 200, 210.

In the 40 MHz band and the 30 kHz SCS, the $L_{CRB}$ may be 10, 15, 20, 25, 30, 40, 45, 50, 60, 70, 75, 80, 90, 100, 105.

In the 40 MHz band and the SCS of 60 kHz, the $L_{CRB}$ may be 10, 15, 20, 25, 30, 40, 45, or 50.

Inner RB allocation must be greater than or equal to $RB_{Start,Low}$ and less than or equal to $RB_{Start,High}$. Outer RB allocation refers to all RBs that are not inner RB allocation.

A-MPR shown in Table 14 may have an error of ±a. a is 0, 0.1, 0.2, 0.3, . . . , may be 2.0.

1-1. Embodiments of the First Disclosure of the Present Specification

Next, simulations performed to obtain A-MPR will be described.

Figure 13:
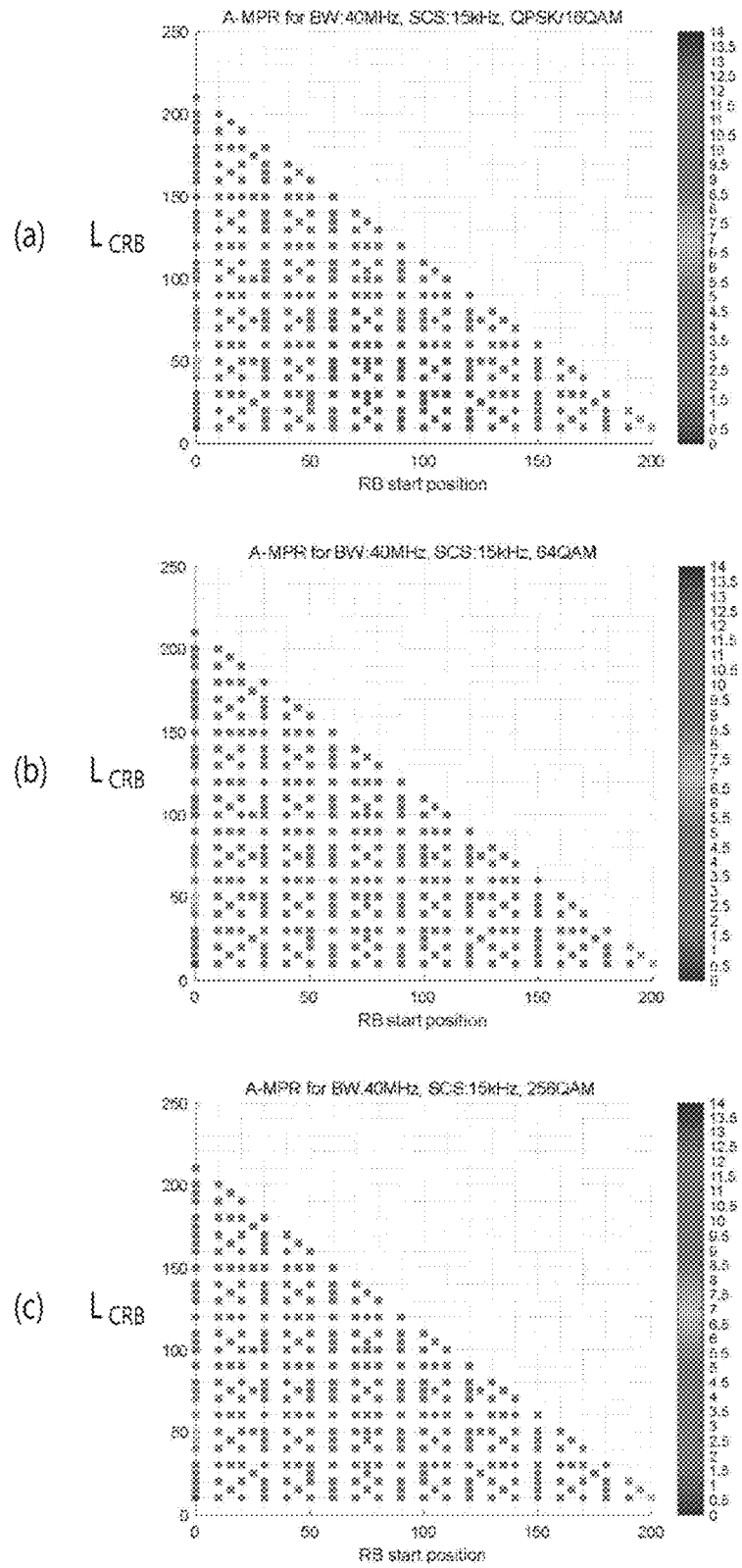
FIG. 13 shows a first embodiment of the first disclosure of the present specification.

FIG. 13 shows a first embodiment of the first disclosure of the present specification.

The simulation results in the case of bandwidth of 40 MHz and SCS of 15 kHz are shown.

The horizontal axis indicates the start RB position, and the vertical axis indicates the $L_{CRB}$. A value corresponding to each start RB position and $L_{CRB}$ indicates an A-MPR value for the V2X UE. For example, in case of 15 kHz SCS in 40 MHz bandwidth, when QPSK or 16QAM modulation is used, when the start RB position is 100 and $L_{CRB}$ is SORB allocated, the A-MPR for the V2X UE is a value between 0 and 2 is applied.

FIG. 13(a) shows a case of 40 MHz bandwidth, 15 kHz SCS, and QPSK/16QAM modulation.

FIG. 13(b) shows the case of bandwidth of 40 MHz, SCS 15 kHz, and 64QAM modulation.

FIG. 13(c) shows the case of bandwidth of 40 MHz, SCS 15 kHz, and 256QAM modulation.

Figure 14:
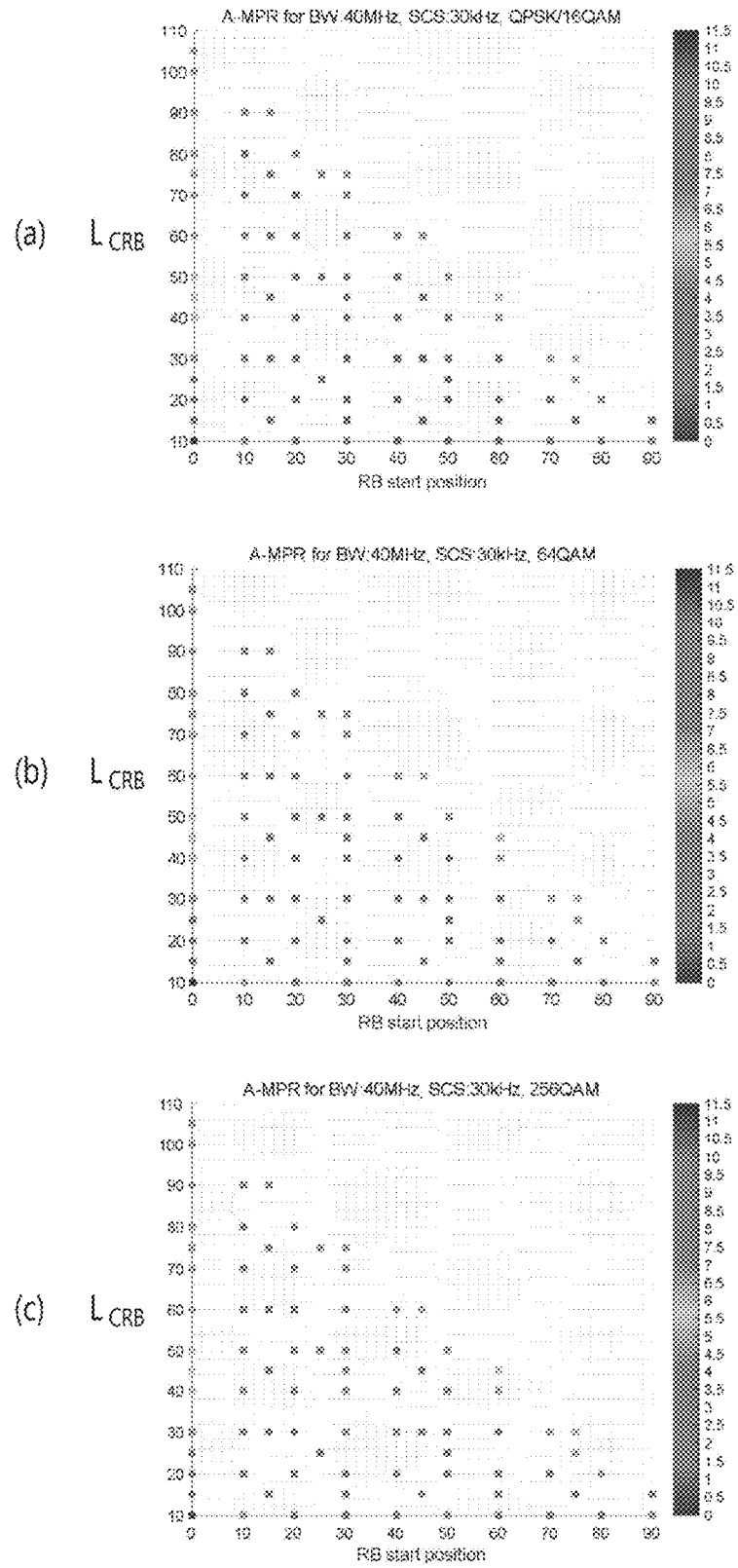
FIG. 14 shows a fourth embodiment of the first disclosure of the present specification.

FIG. 14 shows a fourth embodiment of the first disclosure of the present specification.

The simulation results in the case of channel bandwidth of 40 MHz and SCS 30 kHz are shown.

FIG. 14(a) shows a case of 40 MHz bandwidth, 30 kHz SCS, and QPSK/16QAM modulation.

FIG. 14(b) shows the case of bandwidth 40 MHz, SCS 30 kHz, and 64QAM modulation.

FIG. 14(c) shows the case of bandwidth of 40 MHz, SCS 30 kHz, and 256QAM modulation.

Figure 15:
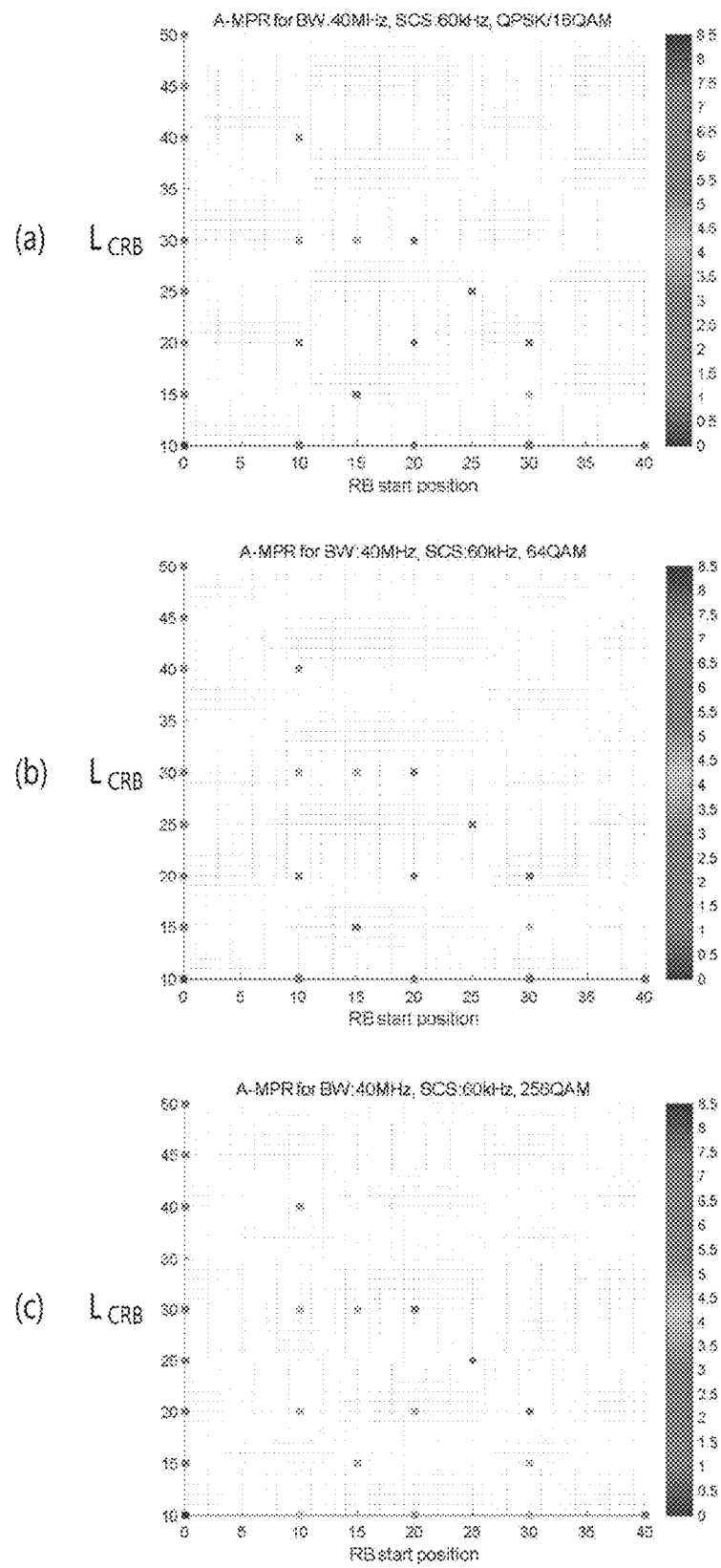
FIG. 15 shows a seventh embodiment of the first disclosure of the present specification.

FIG. 15 shows a seventh embodiment of the first disclosure of the present specification.

The simulation results in the case of channel bandwidth 40 MHz and SCS 60 kHz are shown.

FIG. 15(a) shows the case of a bandwidth of 40 MHz, SCS 60 kHz, and QPSK/16QAM modulation.

FIG. 15(b) shows the case of bandwidth of 40 MHz, SCS 60 kHz, and 64QAM modulation.

FIG. 15(c) shows the case of bandwidth of 40 MHz, SCS 60 kHz, and 256QAM modulation.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
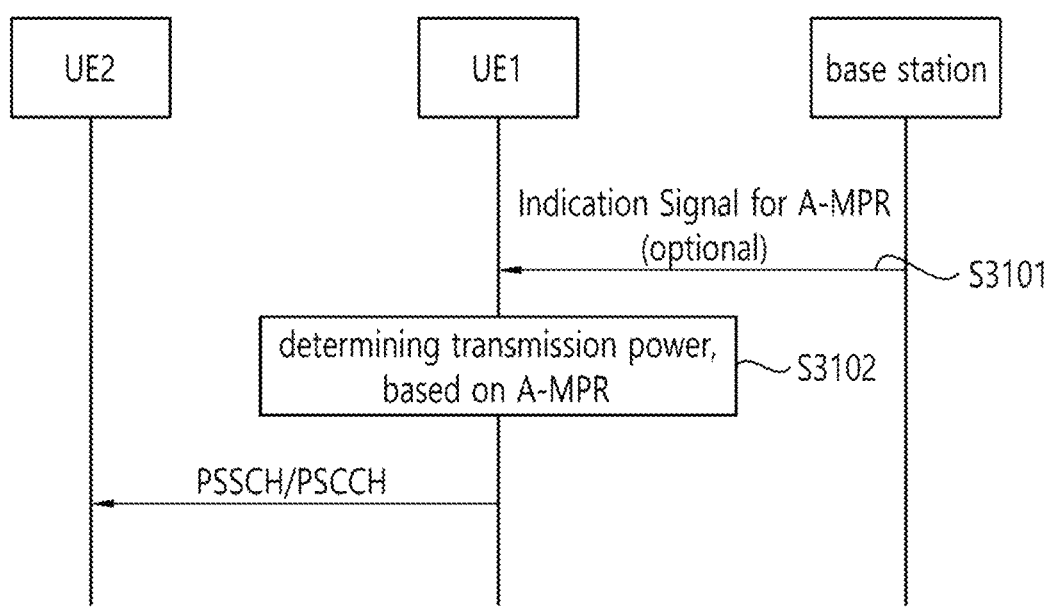
FIG. 16 shows a flowchart in accordance with the disclosure of the present specification.

FIG. 16 shows a flowchart in accordance with the disclosure of the present specification.

The base station may broadcast an indication signal to the UE1. Based on the indication signal, the UE may acquire a network signal value 52 (NS_52). UE1 may select and use A-MPR pre-configured in UE1 itself based on the acquired NS_52. In this way, the UE may select the A-MPR to be used by acquiring the network signal NS_52.

UE1 may determine the transmission power of a sidelink signal (PSSCH/PSCCH) to be transmitted to another UE (UE2) based on the A-MPR information.

UE1 may transmit a sidelink signal (PSSCH/PSCCH) to another UE using the determined transmission power.

Figure 17:
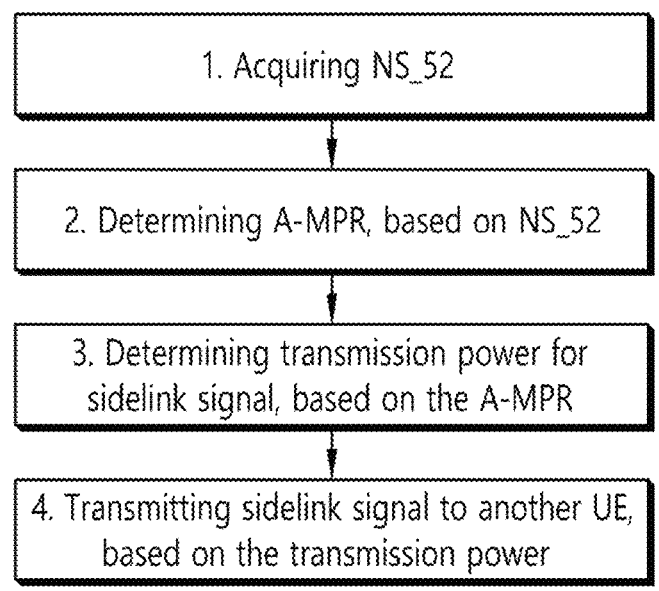
FIG. 17 shows a procedure of a UE according to the disclosure of the present specification.

FIG. 17 shows a procedure of a UE according to the disclosure of the present specification.

1. The UE may acquire the network signal 52 (NS_52).

The UE may receive an indication signal from the base station. The indication signal may include information on NS_52. Alternatively, instead of receiving the indication signal from the base station, the UE may check the A-MPR based on a pre-configured parameter.

2. The UE may check the A-MPR based on NS_52.

3. The UE may determine the transmission power of the sidelink signal based on the A-MPR value.

4. The UE may transmit a sidelink signal to another terminal by using the determined transmission power.

The present specification may have various effects.

For example, through the procedure disclosed in this specification, by applying A-MPR conforming to the FCC regulation conditions to the UE, the UE can perform V2X communication efficiently.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A UE (user equipment), comprising:
at least one transceiver to transmit a signal and to receive a signal; and
at least one processor to control the at least one transceiver,
wherein the at least one processor is configured to acquire a network signal (NS) 52,
wherein the at least one processor is configured to determine A-MPR (additional maximum power reduction), based on the NS 52,
wherein the at least one processor is configured to determine transmission power for a sidelink signal, based on the A-MPR,
wherein the at least one transceiver is configured to transmit the sidelink signal with the transmission power via a modulation type, to another UE,
wherein the sidelink signal is transmitted through a PSSCH (Physical Sidelink Shared Channel) or a PSCCH (Physical Sidelink Control Channel),
wherein the sidelink signal is transmitted through a band having a center frequency of 5885 MHz and a bandwidth of 40 MHz,
wherein the sidelink signal is transmitted through allocated RBs (Resource Blocks), which belong to one among region 1, region 2 and region 3,
wherein the modulation type is one among QPSK (Quadrature Phase Shift Keying), 16QAM (Quadrature Amplitude Modulation), 64QAM and 256QAM,
wherein the A-MPR is determined based on the allocated RBs and the modulation type,
wherein the A-MPR is less than or equal to 8 dB, based on the modulation type being the QPSK and the allocated RBs belonging to the region 2.

2. The UE of claim 1,
wherein the at least one transceiver is configured to receive an indication signal from a base station,
wherein the at least one processor is configured to acquire the NS 52, based on the indication signal.

3. The UE of claim 1,
wherein the A-MPR is pre-configured in the UE.

4. The UE of claim 1,
wherein the region 1 includes i) RBs whose number of RBs is floor ($N_{RB}$*0.2) or less and ii) RBs whose number of RBs is bigger than $N_{RB}$-floor ($N_{RB}$*0.2) or more,
wherein the region 3 includes RBs whose number of RBs is i) greater than or equal to floor ($N_{RB}$/3.5) and ii) less than or equal to $N_{RB}$-floor ($N_{RB}$/3.5)-$L_{CRB}$,
wherein the $L_{CRB}$ is ceil ($N_{RB}$/3.5) or less,
wherein the region 2 includes RBs that do not correspond to the region 1 or the region 3 among the $N_{RB}$ RBS.

5. The UE of claim 4,
wherein the A-MPR is less than or equal to 8 dB, based on the modulation type being the 16QAM and the allocated RBs belonging to the region 2.

6. The UE of claim 4,
wherein the A-MPR is less than or equal to 8.5 dB, based on the modulation type being the 64QAM and the allocated RBs belonging to the region 2.

7. The UE of claim 4,
wherein the A-MPR is less than or equal to 8.5 dB, based on the modulation type being the 256QAM and the allocated RBs belonging to the region 2.

8. The UE of claim 4,
wherein the A-MPR is less than or equal to 6 dB, based on the modulation type being the 256QAM and the allocated RBs belonging to the region 3.

9. The UE of claim 4,
wherein the A-MPR is less than or equal to 14.5 dB, based on the allocated RBs belonging to the region 1.

10. The UE of claim 4,
wherein the A-MPR is less than or equal to 3.5 dB, based on the modulation type being the QPSK and the allocated RBs belonging to the region 3.

11. The UE of claim 4,
wherein the A-MPR is less than or equal to 3.5 dB, based on the modulation type being the 16QAM and the allocated RBs belonging to the region 3.

12. The UE of claim 4,
wherein the A-MPR is less than or equal to 4.5 dB, based on the modulation type being the 64QAM and the allocated RBs belonging to the region 3.

13. A method, comprising:
acquiring, by a UE (user equipment), a network signal (NS) 52,
determining, by the UE, A-MPR (additional maximum power reduction), based on the NS 52,
determining, by the UE, transmission power for a sidelink signal, based on the A-MPR,
transmitting, by the UE, the sidelink signal with the transmission power via a modulation type, to another UE,
wherein the sidelink signal is transmitted through a PSSCH (Physical Sidelink Shared Channel) or a PSCCH (Physical Sidelink Control Channel),
wherein the sidelink signal is transmitted through a band having a center frequency of 5885 MHz and a bandwidth of 40 MHz,
wherein the sidelink signal is transmitted through allocated RBs (Resource Blocks), which belong to one among region 1, region 2 and region 3, wherein the modulation type is one among QPSK (Quadrature Phase Shift Keying), 16QAM (Quadrature Amplitude Modulation), 64QAM and 256QAM, wherein the A-MPR is determined based on the allocated RBs and the modulation type, wherein the A-MPR is less than or equal to 8 dB, based on the modulation type being the QPSK and the allocated RBs belonging to the region 2.

* * * * *